United States Patent [19]

Aliberti et al.

[11] Patent Number: 4,988,749

[45] Date of Patent: Jan. 29, 1991

[54] STABILIZATION OF NITRILE POLYMERS

[75] Inventors: Vincent A. Aliberti, Wilbraham; James K. Stevens, Belchertown, both of Mass.

[73] Assignee: Monsanto Company, St. Louis, Mo.

[21] Appl. No.: 441,598

[22] Filed: Nov. 27, 1989

[51] Int. Cl.$^5$ .............................................. C08L 33/00
[52] U.S. Cl. ..................................... 524/159; 524/381; 524/392; 524/234; 524/235
[58] Field of Search ................ 524/159, 387, 392, 235

[56] References Cited

U.S. PATENT DOCUMENTS

| | | |
|---|---|---|
| 2,498,200 | 2/1950 | Bray, I . |
| 2,560,053 | 7/1951 | Webb et al. ........................ 524/161 |
| 2,643,998 | 6/1953 | Bray, II . |
| 3,065,211 | 11/1962 | Milford et al. . |
| 4,097,440 | 6/1978 | Maximovich et al. .............. 524/141 |
| 4,873,278 | 10/1989 | Nelson . |
| 4,880,856 | 11/1989 | Avakian . |

*Primary Examiner*—Joseph L. Schofer
*Assistant Examiner*—Jeffrey T. Smith
*Attorney, Agent, or Firm*—William J. Farrington

[57] ABSTRACT

Disclosed herein are nitrile polymers which are stabilized against color degradation caused by ionizing radiation by the addition of a stabilizing agent comprising a combination of selected sulfur containing compounds as stabilizers and sulfur containing plasticizers.

8 Claims, No Drawings

STABILIZATION OF NITRILE POLYMERS

BACKGROUND OF THE INVENTION

This invention relates to nitrile polymers stabilized against color degradation caused by ionizing radiation. More particularly, this invention involves the stabilization of nitrile polymers against such discoloration by inclusion of an effective amount of a sulfur containing stabilizer and a sulfur containing plasticizer.

In recent years it has been discovered that certain nitrile polymers having a high proportionate amount of olefinic nitrile component are especially suitable for packaging, test tubes, syringes and other applications particularly because of their excellent water and oxygen barrier properties. However, such nitrile polymers have a tendency to discolor particularly when subject to ionizing radiation used in treating articles made from such nitrile polymers. While a variety of compounds and particularly phenol compounds and triazine compounds such as disclosed in U.S. Pat. No. 3,202,681 and 4,046,735 have been generally known to be useful as stabilizers for various organic compositions, many of such stabilizers are not particularly useful for stabilizing nitrile polymers against color degradation caused by ionizing radiation, e.g. alpha, beta, gamma and electron beam radiation.

Thus, there exists in the art a need for an improved nitrile polymer which is stabilized against color degradation caused by ionizing radiation. This need is provided by the present invention wherein selected sulfur containing compounds are added to the nitrile resin composition.

SUMMARY OF THE INVENTION

The present invention fulfills the aforementioned need by providing nitrile polymers which are stabilized against color degradation caused by ionizing radiation by the addition of a stabilizing agent comprising a combination of selected sulfur containing compounds as stabilizers and sulfur containing plasticizers. More particularly this invention provides a color stable polymer composition comprising at least 40% by weight of an olefinically unsaturated nitrile monomer having the formula:

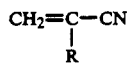

wherein R is hydrogen, a lower alkyl having from 1 to 4 carbon atoms or a halogen and an effective amount of a stabilizing agent.

DETAILED DESCRIPTION OF THE INVENTION

The nitrile polymers of this invention are prepared from at least 40% by weight of an olefinically unsaturated nitrile monomer having the formula:

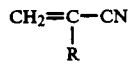

wherein R is hydrogen, a lower alkyl having 1 to 4 carbon atoms or an halogen. Such compounds include acrylonitrile, methacrylonitrile ethacrylonitrile, propioacrylonitrile, alpha chloroacrylonitrile, etc. The most preferred olefinically unsaturated nitriles are acrylonitrile and methacrylonitrile and mixtures thereof.

The nitrile polymer of this invention may contain a comonomer copolymerizable with the olefinically unsaturated nitriles and including:

a. the monovinylidene aromatic hydrocarbon monomers of the formula:

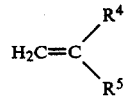

wherein $R^4$ is hydrogen, chlorine or methyl and $R^5$ is an aryl group of 6 to 10 carbon atoms and may also contain substitutes such as halogen as well as alkyl groups attached to the aromatic nucleus, e.g. styrene, alpha methylstyrene, vinyl toluene, alpha chlorostyrene, ortho chlorostyrene, meta chlorostyrene, para chlorostyrene, ortho methylstyrene, para methylstyrene, ethyl styrene, isopropyl styrene, dichloro styrene, vinyl naphthalene, etc.

b. lower alpha olefins of from 2 to 8 carbon atoms, e.g. ethylene, propylene, isobutylene, butene-1, pentene-1 and their halogen and aliphatic substituted derivatives e.g. vinyl chloride, vinylidene chloride, etc.

c. acrylic acid and methacrylic acid and the corresponding acrylate and methacrylate alkyl esters wherein the alkyl group contains from 1 to 4 carbon atoms, e.g. methyl acrylate, ethyl acrylate, propyl acrylate, methyl methacrylate, etc.

d. vinyl esters of the formula:

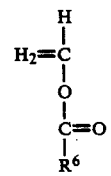

wherein $R^6$ is hydrogen, an alkyl group of from 1 to 10 carbon atoms, an aryl group of 6 to 10 carbon atoms, e.g. vinyl formate, vinyl acetate, vinyl propionate, vinyl benzoate, etc.

e. vinyl ether monomers of the formula:

wherein $R^7$ is an alkyl group of from 1 to 8 carbon atoms, an aryl group of from 6 to 10 carbon atoms or a monovalent aliphatic radical of from 2 to 10 carbon atoms, which aliphatic radical may be hydrocarbon or oxygen containing, i.e. an aliphatic radical with ether linkages and may also contain other substituents such as halogen, carbonyl, etc. Examples of these monomeric vinyl ethers include vinyl methyl ether, vinyl ethyl ether, vinyl n-butyl ether, vinyl 2-chloroethyl ether, vinyl phenyl ether, vinyl cyclohexyl ether, 4-butyl cyclohexyl ether, and vinyl p-chlorophenylene glycol ether, etc.

Other useful comonomers in the practice of this invention are the lower alkyl itaconicate and fumarate esters and those comonomers which contain a mono- or di-nitrile function. Examples of these include methylene glutaronitrile, 2,4-dicyanobutene-1, vinylidene cyanide, crotonitrile, fumarodinitrile, maleodinitrile. The preferred comonomers are the monovinylidene aromatic hydrocarbons, lower alpha olefins and acrylic and methacrylic acid and the corresponding acrylate and methacrylate esters with the monovinylidene aromatic hydrocarbons being more particularly preferred. More specifically preferred is styrene and alpha methylstyrene.

This invention also contemplates the use of a synthetic or natural rubber component such as polybutadiene, isoprene, neoprene, nitrile rubbers, natural rubbers, acrylonitrile-butadiene copolymers, ethylene-propylene copolymers, chlorinated rubbers, etc., which are used to strengthen or toughen the nitrile polymers of this invention. This rubbery component may be incorporated into the nitrile containing polymer by any of the methods which are well known to those skilled in the art, e.g., direct polymerization of monomers, polyblends, grafting the acrylonitrile monomer mixture onto the rubbery backbone, etc. Especially preferred are polyblends derived by mixing a graft copolymer of acrylonitrile and comonomer on the rubbery backbone with another copolymer of acrylonitrile and the same comonomer. Generally, such rubber component may comprise from 0 to about 25% and preferably up to about 10% by weight of the nitrile polymer composition.

The sulfur containing stabilizers used in this invention are selected from the group consisting of:
thioglycerol
glycerol dimercaptoacetate
thiodiethanol
t-dodecyl mercaptan; and
dibenzyl disulfide The sulfur containing plasticizers used in this invention are selected from the group consisting of:
N-aryl sulfonamides
N-alkyl aryl sulfonamides; and
N-toluene sulfonamide-formaldehyde
wherein the alkyl group contains 2 to 6 carbon atoms and the aryl group contains 6 to 9 carbon atoms, with the preferred alkyl groups being ethyl, propyl, isopropyl, butyl and isobutyl and the preferred aryl groups being benzene and toluene. Especially preferred are benzene sulfonamide, toluene sulfonamide, N-ethyl o,p-toluene sulfonamide, N-butyl benzene sulfonamide, N-propylbenzene sulfonamide and N-isopropylbenzene sulfonamide.

The amount of the sulfur containing stabilizer used in this invention is from about 0.05 to about 1.0% and preferably 0.1 to 0.5% by weight of stabilizing agent based on the total weight of the nitrile polymer. The amount of sulfur containing plasticizers used in combination with the sulfur containing stabilizer is from about 0.5 to 7.0 and preferably from 1.0 to 0% by weight based on the total weight of the nitrile polymer.

The sulfur containing stabilizers, sulfur containing plasticizers and nitrile polymers are well known and are generally available. The nitrile polymers may be prepared by any of the known general techniques of polymerization including bulk or mass polymerization, solution polymerization and emulsion or suspension polymerization.

The nitrile monomer component will preferably comprise from about 50 to about 90% and more preferably from about 55 to about 80% by weight, based on the total weight of the nitrile polymer.

The stabilizers and plasticizers are generally incorporated into the nitrile polymer by blending. This may be carried out for example by adding them to the nitrile polymer in the polymer recovery steps such as during coagulation, stripping, washing, drying, etc. or by steeping the polymer in a liquid containing the stabilizers and plasticizers. A preferred method is to dry blend the nitrile polymer, stabilizers and plasticizer prior to any fabrication steps. This may be done in any of the suitable commercially available equipment, e.g. Henschel mixers, Pappenmeier mills and the like. An especially convenient method for compounding involves dispersing the sulfur containing stabilizer in the sulfur containing plasticizer, adding the combination to the nitrile polymer and then heating and mixing. Other conventional additives may also be included in the plasticizer/stabilizer component or added to the nitrile polymer separately. These additives included, but are not limited to, dyes, pigments, thermal stabilizers, antioxidants, lubricants and the like.

The sulfur containing stabilizers and sulfur containing plasticizers when used alone in the present invention reduce the amount of color caused by irradiation. However, the most effective way to achieve a color reduction of at least 50% is to use a combination of stabilizer and plasticizer.

The following examples are set forth in illustration of the present invention and should not be construed as limitations thereof.

In the following examples, the nitrile polymer in bead form, the sulfur containing stabilizer and/or sulfur containing plasticizers are blended in a Pappenmeier mill, heated to 90° C. for a time sufficient to allow the stabilizer and plasticizer to be absorbed by the beads, e.g. usually about 5 to 10 minutes. At this point the beads usually become sticky. The batch is then cooled to the point where the stabilized beads flow freely, e.g. about 40 to 50° C. and then the compounded beads are removed from the mill. The stabilized beads are then molded into chips about 10.5 by 7.7 by 1.5 mm in size for color testing after irradiation. The molded chips are exposed to 3.5 megarads of electron beam radiation. The molded chips are passed on a belt through an irradiated field having a strength of 3 million electron volts (MEV) at 1 milliamp (ma). One pass at a belt speed of 43.2 centimeters per minute is equivalent to a dose of 3.5 megarads. The irradiation unit is manufactured by High Voltage Engineering. A Pacific Scientific XL-835 colorimeter unit is used for measuring color. The unit uses the tristimulus system (X, Y, and Z measurements) according to ASTM test D-1925.

EXAMPLE 1

A nitrile polymer containing 62% by wt of acrylonitrile and 38% by wt of styrene is compounded with various sulfur containing stabilizers and/or sulfur containing plasticizers, irradiated and tested for color. The yellowness index (YI) of the irradiated stabilized samples is compared to the YI of a control sample which does not contain stabilizer or plasticizer and the % reduction in YI is calculated by dividing the difference in YI of the control and the stabilized sample by the YI of the control.

TABLE 1

| Stabilizer | % by wt[1] | Control YI[2] | Stabilized YI | % Reduction |
|---|---|---|---|---|
| Thioglycerol | 0.2 | 41.7 | 31.2 | 25 |
| t-dodecyl mercaptan | 0.2 | 41.7 | 36 | 14 |

TABLE 1-continued

| Stabilizer | % by wt[1] | Control YI[2] | Stabilized YI | % Reduction |
|---|---|---|---|---|
| glycerol dimercapto-acetate | 0.2 | 41.7 | 32.5 | 22 |
| thiodiethanol | 0.2 | 42 | 33.7 | 20 |
| dibenzyl disulfide | 1.0 | 41.7 | 35.8 | 14 |
| toluene sulfonamide-formaldehyde | 2.0 | 42 | 28.8 | 31 |
| N-ethyl toluene sulfonamide | 2.0 | 42 | 25.4 | 40 |
| thioglycerol/N-ethyl toluene sulfonamide | 0.2/2.0 | 41.2 | 17.1 | 58 |

[1]% by weight of stabilizer and plasticizer is based on the weight of the nitrile polymer.
[2]Control is nitrile polymer without stabilizer or plasticizer.

The results in Table 1 show that when thioglycerol and N-ethyl toluene sulfonamide are used in combination there is a drop in color of 58% vs. 25% for the thioglycerol alone, and 40% for the N-ethyle toluene sulfonamide alone.

EXAMPLE 2

The nitrile resin used in Example 1 is compounded with 0.2% by weight thioglycerol and with 3% by weight of various N-alkyl benzene sulfonamides. The color (YI) of the compounded polymer before and after radiation is shown in Table 2 below.

TABLE 2

| Sulfonamide | YI Before Radiation | YI After Radiation | % YI Reduction[1] |
|---|---|---|---|
| Control (no additives) | 10.3 | 43.0 | — |
| Control (only thioglycerol) | 12.8 | 23.0 | 46 |
| N-butylbenzene sulfonamide | 10.8 | 16.8 | 61 |
| N-ethylbenzene sulfonamide | 12.1 | 17.2 | 60 |
| N-propylbenzene sulfonamide | 14.5 | 21.1 | 51 |
| N-isopropylbenzene sulfonamide | 11.8 | 18.8 | 56 |

[1]% YI reduction over control with no additives

The results in Table 2 show that the nitrile resin without stabilizers undergoes a color increase of from 10.3 to 43.0 while the color of the samples containing both thioglycerol and plasticizer increases to a point in the range of from 16.8 to 21.1.

EXAMPLE 3

In this example, the nitrile polymer used in Example 1 is compounded with 0.5% by weight of dibenzyl disulfide and 2% by weight of N-ethyl o,p-toluene sulfonamide. The initial color (YI) was 8.8 (versus 9.7 for the control with no additives) and the YI after irradiation was 20.2 (versus 41.2 for the control) for an improvement of about 51%.

EXAMPLE 4

In this example, a nitrile polymer containing about 62% acrylonitrile and about 38% styrene and having a YI of greater than the 10.3 value for the nitrile polymer used in Example 1 (as judged visually) is compounded with 3% by weight of N-butyl benzene sulfonamide alone and N-butyl benzene sulfonamide in combination with 0.2% by weight of glycerol dimercapto acetate. The results are set forth below:

TABLE 3

| Stabilizer | Before Radiation YI | After Radiation YI |
|---|---|---|
| N-butyl benzene sulfonamide (alone) | 13.8 | 30.5 |
| glycerol dimercapto acetate (combination) | 16.9 | 27.9 |

EXAMPLE 5

This example lists sulfur containing compounds which do not have a color stabilizing effect on the nitrile polymers used in the present invention. The nitrile polymer used in Example 1 is compounded with 0.2% by weight based on the weight of the nitrile polymer of the sulfur compounds listed below. In each case the color of the compounded nitrile polymer, as judged visually, increased to a degree that the sulfur compounds were deemed unsuitable for use in this invention.

Sulfur Compound t-nonyl polysulfide
phenothiazine
sulfur
isooctyl thioglycolate
thiodiphenol
benzothiazyl disulfide
depentamethylenethiluram tetrasulfide
tetramethylthiuram disulfide
4-4' dithiomorpholine
4 morpholinyl 2 mercaptobenzothiazole disulfide
selenium diethyl dithiocarbamate
2 mercaptobenzothiazole

What is claimed:
1. A nitrile polymer molding composition which comprises from 40% to 80% by weight of a nitrile monomer having the formula:

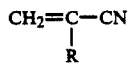

wherein R is hydrogen, lower alkyl having from 1 to 4 carbon atoms or halogen; and a monovinylidene aromatic hydrocarbon monomer having the formula:

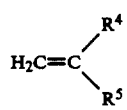

wherein $R^4$ is hydrogen, chlorine or methyl and $R^5$ is an aryl group of 6 to 10 carbon atoms, and
(a) from about 0.5 to about 1.0% by weight based on the weight of the molding composition of at least one sulfur containing stabilizer selected from the group consisting of:
thioglycerol
glycerol dimercaptoacetate
thiodiethanol
t-dodecyl mercaptan; and
dibenzyl disulfide
and (b) from about 0.5 to about 7.0% by weight based on the weight of the molding composition of at least one sulfur containing plasticizer selected from the group consisting of:

N-aryl sulfonamides

N-alkyl aryl sulfonamides; and

N-toluene sulfonamide-formaldehyde wherein the alkyl group contains from 2 to 4 carbon atoms and the aryl group contains from 6 to 9 carbon atoms.

2. The composition of claim 1 wherein said nitrile monomer is acrylonitrile.

3. The composition of claim 1 wherein said nitrile monomer is methacrylonitrile.

4. The composition of claim 1 wherein the stabilizer is thioglycerol.

5. The composition of claim 1 wherein the stabilizer is thioglycerol and the plasticizer is a N-alkyl aryl sulfonamide.

6. The composition of claim 1 wherein from about 0.1 to about 0.5% by weight of stabilizer is used in combination with about 1.0 to about 4.0% by weight of plasticizer based on the total weight of nitrile composition.

7. The composition of claim 1 wherein said nitrile polymer is a copolymer of acrylonitrile and styrene.

8. The composition of claim 1 wherein said comonomer is styrene, and the stabilizer is thioglycerol.

* * * * *

UNITED STATES PATENT AND TRADEMARK OFFICE
CERTIFICATE OF CORRECTION

PATENT NO. : 4,988,749
DATED : January 29, 1991
INVENTOR(S) : Vincent A. Aliberti, James K. Stevens It is certified that error appears in the above-identified patent and that said Letters Patent is hereby corrected as shown below:

Col. 3, line 54, reads "0.5 to 7.0 and preferably from 1.0 to 0% by weight"
should read --0.5 to 7.0 and preferably from 1.0 to 4.0% by weight--

Signed and Sealed this

Ninth Day of June, 1992

Attest:

DOUGLAS B. COMER

Attesting Officer    Acting Commissioner of Patents and Trademarks